No. 628,033. Patented July 4, 1899.
F. A. PILKINGTON.
ROLLER BEARING.
(Application filed Nov. 12, 1898.)
(No Model.)
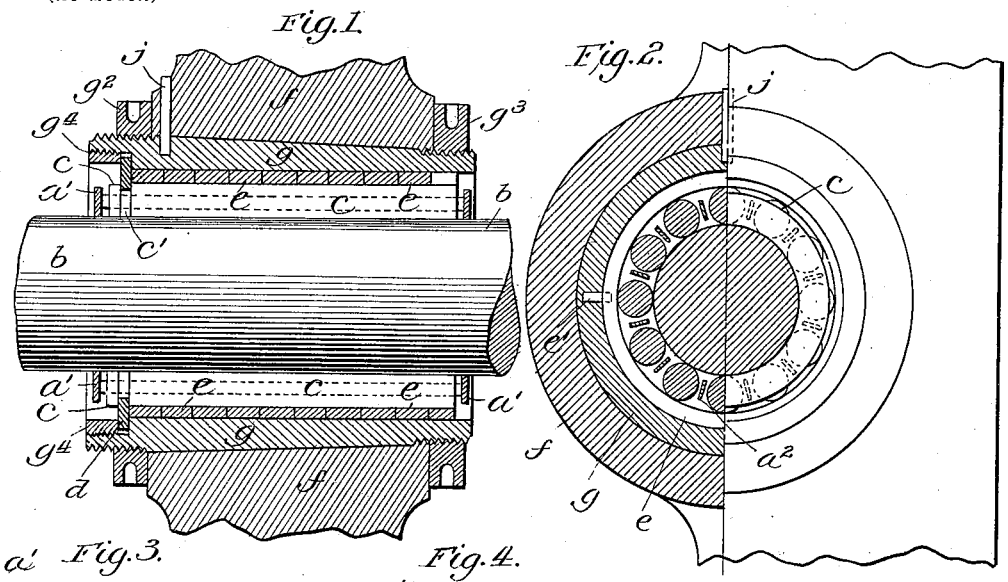
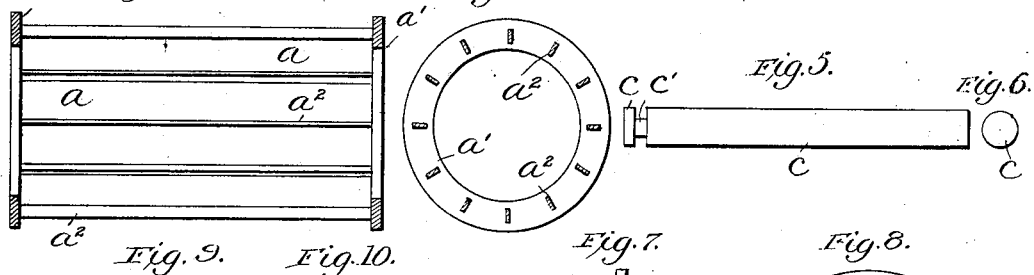
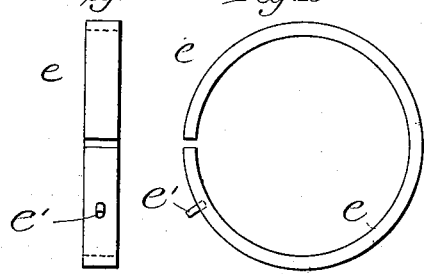
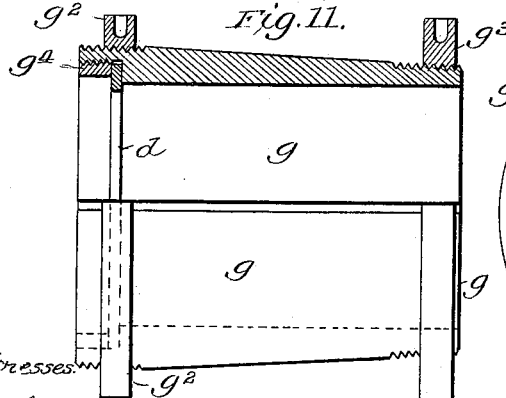
Witnesses:
H. S. Rohrer.
Nellie Callahan.
Inventor:
Francis Angelo Pilkington.
by Wm. F. Finckel, his Atty.

UNITED STATES PATENT OFFICE.

FRANCIS ANGELO PILKINGTON, OF MANCHESTER, ENGLAND.

ROLLER-BEARING.

SPECIFICATION forming part of Letters Patent No. 628,033, dated July 4, 1899.

Application filed November 12, 1898. Serial No. 696,284. (No model.)

*To all whom it may concern:*

Be it known that I, FRANCIS ANGELO PILKINGTON, a citizen of Great Britain, residing at Manchester, in the county of Lancaster, England, have invented a certain new and useful Improvement in Roller-Bearings, of which the following is a full, clear, and exact description.

This invention relates to an improvement in roller-bearings such as are employed in machinery or shafting.

The object of this invention is to enable said roller-bearings to be adjusted when from wear or other causes adjustment may be necessary. I attain this object by the means hereinafter described, reference being made to the accompanying sheet of drawings, in which—

Figure 1 is a longitudinal section of a roller-bearing that is constructed according to my invention fitted to a shaft. Fig. 2 is partly an end view and partly a transverse section of the same bearing. The remaining views, Figs. 3 to 12, are details of the several parts constituting the aforesaid bearing.

In the views similar letters refer to similar parts.

In this invention I construct a cradle, as $a$. (Shown in Figs. 3 and 4, which are respectively a side view and transverse section of said cradle.) The ends $a'$ are formed of an internal diameter to fit on a spindle or a shaft, as $b$, but not so as to bind thereon. The number of divisions $a^2$ which are parallel with the shaft is determined by the size of the spindle or shaft $b$ or the rollers $c$. I make the rollers $c$ (shown in Figs. 5 and 6) of a length to fit into and between the divisions $a^2$ and form a bearing for the shaft. I form a groove $c'$ at one end of each of said rollers and fit therein a flat washer, as $d$, that is split transversely. Said washer may be placed therein by passing the groove or neck of each roller through the split portion $d'$ (shown in Figs. 7 and 8, which are respectively side and end views of said washer) and then slipping each roller around the shaft by revolving the cradle $a$, but not the washer $d$. I place a row of split rings, as $e$, (represented by Figs. 9 and 10,) around the rollers $c$, by which said rollers are retained on the shaft $b$. In order to give the necessary compression to the aforesaid split rings, and thereby either tighten or ease the roller-bearings, I make the interior of the boss $f$ of a taper form, as Fig. 1, or of an internal diameter that is larger on one side than on the other. I construct a split sleeve, as $g$, (represented by the side and end views shown in Figs. 11 and 12,) that is bored parallel, but whose periphery is cone-shaped or of the same taper as the interior of the boss $f$. I form a screw-thread on each end of the said sleeve and fit screw-nuts thereon, as $g^2$ and $g^3$. At one end of the sleeve $g$ I fit a screwed ring $g^4$ into a recess that has an internal screw-thread formed therein.

In applying my invention I pass the shaft or spindle through the cradle $a$ and place in said cradle rollers, as $c$, parallel with and in contact with the shaft, securing their grooved ends by the split ring or washer $d$. I place split rings, as $e$, over and around the aforesaid rollers. I then place the cradle $a$, with the rollers $c$, the split rings $e$, and the ring or washer $d$, within the sleeve $g$. The rings $e$ are prevented turning around in the sleeve $g$ by a pin $e'$, projecting from each ring into said sleeve, as in Fig. 2. I then screw the ring $g^4$ against the plate or washer $d$. I place the bearing thus formed within the boss $f$ and apply the necessary compression to the split rings $e$ by screwing up the nut $g^3$. The nut $g^2$ is then tightened and the nut $g^3$ thereby locked. The aforesaid sleeve $g$ is prevented turning around in the boss $f$ by a set-pin $j$, that is passed through the boss.

In order to compensate for any wear in the bearings hereinbefore described, the nut $g^2$ is slackened and the sleeve $g$ drawn within the boss by the nut $g^3$ a sufficient distance to compress the split rings $e$ as much as may be required.

I am aware that prior to my invention roller-bearings have been constructed so as to be capable of adjustment. I therefore desire to restrict myself to the combination I have hereinbefore described, and

What I claim, and desire to secure by Letters Patent of the United States, is—

1. In a roller-bearing, the combination with a series of rollers and means to confine them about a shaft, of a series of split rings arranged around said rollers, and an adjustable sleeve encircling said split rings and adapted to compress them about said rollers, substantially as and for the purpose described.

2. In a roller-bearing, a cradle, a series of rollers arranged in said cradle, means for confining said cradle and rollers about a shaft, a series of split rings arranged around said rollers, and a split sleeve encircling said split rings and adapted to be adjusted to compress said split rings about the rollers, substantially as and for the purpose described.

3. In a roller-bearing, a cradle, a series of rollers provided with grooved ends and arranged in said cradle, a shaft upon which said cradle and rollers are mounted, a split ring $d$ engaging said grooved rollers, a screw-threaded ring $g^4$ for securing said ring $d$ in place, a series of split rings arranged about said rollers, a split sleeve having a conical exterior surface and encircling said series of split rings, a conical seat or bearing for said sleeve, and nuts for adjusting said sleeve in its seat or bearing whereby said split rings are compressed about the rollers, substantially as and for the purpose described.

4. In a roller-bearing, a cradle, a series of rollers provided with grooved ends and arranged in said cradle, a shaft upon which said cradle and rollers are mounted, a split ring $d$ engaging said grooved rollers, a screw-threaded ring $g^4$ for securing said ring $d$ in place, a series of split rings arranged about said rollers, a split sleeve having a conical exterior surface and encircling said series of split rings, a boss provided with a conical seat or bearing for said sleeve, a set-pin engaging said boss and sleeve, and nuts for adjusting said sleeve in its seat or bearing whereby said split rings are compressed about the rollers, substantially as and for the purpose described.

In testimony whereof I have hereunto set my hand this 28th day of October, A. D. 1898.

FRANCIS ANGELO PILKINGTON.

Witnesses:
   GEO. H. HARRIS,
   NED. PRESCOTT,